United States Patent [19]
Sowa

[11] 3,974,114
[45] Aug. 10, 1976

[54] COMPOUND FOR PINHOLE-FREE ROTATIONAL CASTING

[75] Inventor: Michael William Sowa, East Brunswick, N.J.

[73] Assignee: Union Carbide Corporation, New York, N.Y.

[22] Filed: June 30, 1971

[21] Appl. No.: 158,572

Related U.S. Application Data

[63] Continuation of Ser. No. 847,431, Aug. 4, 1969, abandoned.

[52] U.S. Cl................. 260/23 H; 260/45.85 H; 260/45.85 S; 260/45.95 H; 264/310
[51] Int. Cl.²............................................. C08J 3/20
[58] Field of Search.............. 260/23 H; 264/310

[56] References Cited
UNITED STATES PATENTS

| | | | |
|---|---|---|---|
| 2,330,108 | 9/1943 | Bradshaw | 260/23 |
| 2,448,799 | 9/1948 | Happoldt et al. | 260/23 |
| 2,462,331 | 2/1949 | Myers | 260/23 |
| 3,193,521 | 7/1965 | Jasching | 260/45.8 |
| 3,251,792 | 5/1966 | Homberg | 260/23 |
| 3,278,483 | 10/1966 | Wright et al. | 260/23 X |
| 3,627,869 | 12/1971 | Walton | 264/310 X |

Primary Examiner—Eugene C. Rzucidlo
Attorney, Agent, or Firm—James J. O'Connell

[57] ABSTRACT

Salts of fatty acids such as calcium stearate and lithium stearate are added to olefin polymer-based rotational molding compositions to provide rotational moldings with pinhole-free surfaces.

21 Claims, No Drawings

COMPOUND FOR PINHOLE-FREE ROTATIONAL CASTING

CROSS-REFERENCE TO RELATED PATENT APPLICATIONS

This patent application is a continuation of application Ser. No. 847,431 filed Aug. 4, 1969, now abandoned.

BACKGROUND OF THE INVENTION

1. Field of the Invention

The invention relates to the rotational casting of olefin polymer-based compositions.

2. Description of the Prior Art

In order to obtain maximum physical properties, polyolefins, such as polyethylene, which are used in rotational molding compositions or processes must be highly stabilized. Typical stabilizers which might be used in this regard are 2,6-di-tert-butyl-para-cresol, and dilauryl thiodipropionate. When the polyolefin-based compositions, however, are stabilized with such stabilizer systems, problems arise with respect to pinholes on the surfaces of the molded part or object which is formed in the rotational molding or casting process. Whereas an unstabilized resin-based system provides a molded object having inferior physical properties but which is free of surface pinholes, the stabilized system provides a molded object which has vastly improved physical properties, but which has surface pinholes. The surface pinholes are particularly objectionable on the molded object when the molded object must subsequently be painted. The paint will not bridge across the pinholes with the result that a severely spotted pinhole surface results. Thus, prior to the present invention, polyolefin-based rotational molding compositions which were highly stabilized had to be used for molding unpainted articles or else the manufacturer thereof had to resign himself to accepting a severely spotted, painted, molded object.

SUMMARY OF THE INVENTION

Polyolefin-based rotational molding compositions which are highly stabilized are protected against surface pinholes in the molded object by the use of various fatty acid salts in the molding composition.

An object of the present invention is to provide pinhole-free rotationally-cast objects from polyolefin-based compositions.

Another object of the present invention is to provide polyolefin-based compositions for rotational molding processes which will provide surfaces which are free of pinholes.

A further object of the invention is to provide a process whereby polyolefin-based compositions may be rotationally cast so as to avoid the appearance of pinholes on the surfaces of the resulting molded object.

DESCRIPTION OF THE PREFERRED EMBODIMENT

It has now been found that molded objects which are free of surface pinholes can be readily prepared by rotationally molding highly stabilized polyolefin-based compositions by incorporating into the rotational molding compositions certain salts of fatty acids.

Fatty Acid Salts

The fatty acid salts which may be used to provide molded objects with pinhole-free surfaces according to the present invention may be prepared from saturated and unsaturated $C_8$ to $C_{18}$ fatty acids and metallic ions or other cations. The fatty acids include stearic acid, lauric acid, caprylic acid and ricinoleic acid. The cations include $Ca^{++}$, $Li^+$, $Mg^{++}$, $Cd^{++}$, $Ba^{++}$ and $Al^{+++}$. Specific examples of the salts are the following: calcium stearate, lithium stearate, calcium laurate, cadmium stearate, magnesium stearate, aluminum stearate, barium stearate, calcium octoate and lithium ricinoleate.

About 0.001 to 0.5, and preferably about 0.01 to 0.04 per cent by weight of the fatty acid salt is used per 100 parts by weight of olefin polymer in the rotational casting composition. The salts may be used individually or in combination with each other.

The fatty acid salts are solid particulate materials at room temperature and the dispersion of the fatty acid salt into the olefin polymer-based compositions can be effected by various dispersion techniques commonly employed by those skilled in the art of preparing rotational molding compositions. Such procedures would include the following: dry blending by means of a Henshel intensive mixer, a ribbon blender, or tumbling; or hot compounding in a Banbury, Stewart Bolling or Warner Pflieder compounding extruder.

Olefin Polymers

The olefin polymers employed in the rotational molding compositions of the present invention are normally solid materials, that is, solid at room temperature. Any olefin polymer which is capable of being used in a rotational molding composition can be used in the compositions of the present invention. The term "olefin polymer" thus includes homopolymers of the olefins as well as interpolymers of one or more olefins with each other and up to about 50 weight per cent of one or more monomers which are copolymerizable with such olefins.

The olefin polymers would include homopolymers and interpolymers of olefins such as ethylene, propylene, 1-butene, isobutylene, as well as interpolymers of one or more of such olefins and one or more other monomers which are interpolymerizable with such olefins, such as other vinyl compounds, i.e., those having the group

Such other vinyl compounds would include: vinyl aryls such as styrene, o-methoxystyrene, p-methoxystyrene, m-methoxystyrene, o-nitrostyrene, n-nitrostyrene, o-methylstyrene, p-methylstyrene, m-methylstyrene, p-phenylstyrene, o-phenylstyrene, m-phenylstyrene, vinyl-naphthalene and the like; vinyl and vinylidene halides such as vinyl chloride, vinylidene chloride, vinylidene bromide and the like; vinyl esters such as vinyl acetate, vinyl propionate, vinyl butyrate, vinyl chloroacetate, vinyl chloropropionate, vinyl benzoate, vinyl chlorobenzoate and the like; acrylic and alpha-alkyl acrylic acids, their alkyl esters, their amides and their nitriles, such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-di-methyl methacrylamide, acrylonitrile, chloroacrylonitrile, methacrylonitrile, ethacrylonitrile, and the like; alkyl esters of maleic and fumaric acid such as dimethyl maleate, diethyl maleate and the like; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone and the like; also vinyl pyridine, N-vinyl carbazole, N-vinyl pyrollidine, ethyl methylene malonate and the like.

Preferred copolymers are the ethylene copolymers such as ethylene/ethyl acrylate copolymers, ethylene/vinyl acetate copolymers, ethylene/vinyl chloride copolymers, ethylene/acrylic acid copolymers, and the like.

Also included in the term polymer are blends of one polymer with one or more other polymers. Illustrative of such blends are polyethylene with polypropylene, low-density polyethylene with high-density polyethylene, polyethylene with olefin copolymers such as these indicated above for example, ethylene/acrylic acid copolymers, ethylene/methyl acrylate copolymer, ethylene/ethylacrylate copolymer, ethylene/vinyl acetate copolymer, ethylene/acrylic acid/ethyl acrylate terpolymer, ethylene/acrylic acid/vinyl acetate terpolymer, and the like.

Also included within the term polymer are the metallic salts of those olefin copolymers, or blends thereof, which contain free carboxylic acid groups. Illustrative of such polymers are ethylene/acrylic acid copolymer, ethylene/methacrylic acid, oxidized polyolefins, propylene/acrylic acid copolymer, butene/acrylic acid copolymer and the like.

Illustrative of the metals which can be used to provide the salts of said carboxylic acid polymers are the one, two, and three valence metals, such as sodium, lithium, potassium, calcium, magnesium, aluminum, barium, zinc, zirconium, beryllium, iron, nickel, cobalt, and the like.

The preferred olefin polymers for use in the present invention are homopolymers of ethylene and the most preferred polymers are those having a melt index of about 1 to 25 grams per 10 minutes, a density of about 0.91 to 0.97, a reduced viscosity of about 0.86 to 1.16 at 130°C. in decalin as a solvent. Low-density ethylene polymer has a density of between approximately 0.91 and 0.925, medium density ethylene polymer has a density of between approximately 0.925 and 0.940, and high density ethylene polymer has a density of between approximately 0.94 and 0.97. The low density homopolymers of ethylene are the most preferred olefin polymers to be used in the present invention, although the medium and high density polymers may also be used.

The olefin polymers may be used in the form of powders for rotational molding, i.e., powders which have a particle size which allow 100 percent of the powder to pass through a ≥ 15 mesh screen, i.e. 15–35 mesh screen.

The Stabilizers

As noted above the rotational molding compositions of the present invention contain heat and/or light and/or UV stabilizers for the olefin polymers. These stabilizers are present in stabilizingly effective quantities. Such amounts are about 0.001 to 1, and preferably about 0.01 to 0.05, per cent by weight per 100 parts by weight of olefin polymer. The stabilizers which may be employed in the compositions of the present invention include all those commonly employed in olefin polymer-based rotational molding compositions.

Such stabilizers include antioxidants such as amines, such as diphenylamine, phenyl-$\alpha$-naphthylamine, phenyl-$\beta$-naphthylamine, diphenyl-p-phenylenediamine, N,N'-phenylcyclohexyl-p-phenylenediamine and N,N'-di-$\beta$-naphthyl-p-phenylenediamine; phenols, such as p-hydroxyphenylcyclohexane, di-p-hydroxyphenylcyclohexane, dicresylolpropane, 2,6-di-tert-butyl-p-cresol, 2,4,6-tri-tert-butylphenol, condensation products of dialkylphenols with formaldehyde, reaction products of phenol with styrene, 1,1'-methylene-bis-(4-hydroxy-3,5-tert-butylphenol), 2,2'-methylene-bis-(4-methyl-6-tert-butylphenol), 2,6-(2-tert-butyl-4-methyl-6-methylphenyl)-p-cresol, phenylethylpyrocatechol, phenylisopropylpyrocatechol, 1,1,3-tris(2'-methyl-5'-t-butyl-4-hydroxy-phenyl)butane, 2,2-methylene-bis[6-($\alpha$-methylcyclohexyl)-4-methylphenol], 1,3,5-trimethyl-2,4,6-tris(3',5'-di-t-butyl-4-hydroxybenzyl)-benzene and $\alpha$-naphthol; and sulfur containing compounds such as 2,2'-thio-bis-(4-methyl-6-tert-butylphenol), 4,4'-thio-bis-(3-methyl-6-tert-butylphenol), thio-bis($\beta$-naphthol), thio-bis-(N-phenyl-$\beta$-naphthylamine), methylthio-2-naphthalene, diphenyl sulfide, diphenyl disulfide, 3-tolyl disulfide, 1-dodecyl disulfide, polymeric 1,10-decanedithiol, 2-toluene thiol, 2-naphthylthiol, mercaptobenzothiazole, 1-dodecyl mercaptan, phenyl benzyl sulfide, 2,2'-tert-butyl-4-methyl phenol sulfide, tetramethylthiurammonium sulfide, tetramethylthiuram disulfide, 2,2'-diphenyldiamine disulfide, 4,4'-diphenyldiamine disulfide, mercaptobenzimidazole, di-$\beta$-naphthyl sulfide, methyl-$\beta$-naphthyl sulfide, 2,2'-thio-bis-(4-methyl-6-tert-butyl phenol) and dilauryl thiodipropionate; and other compounds such as 2,6-di-tert-butyl-4-methylphenyl, esters of pyrocatecholophosphorus acid, phosphites of $\alpha$-naphthol and pyrocatechol and carbon blacks.

The preferred stabilizers which are employed in the present invention are 2,6-di-tert-butyl-p-cresol (DBPC) and dilauryl thiodipropionate (DLTDP).

The stabilizers may be used individually or in various combinations with one another in the compositions of the present invention.

Molding Compositions

The molding compositions of the present invention may be in any of the forms of such compositions which are commonly employed in the rotational molding arts, such as powders of a size which will pass through a ≥ 15 mesh screen, i.e. 15–35 mesh screen.

These molding compositions may be thermoplastic or thermosetting in nature. Where they are thermosetting they may contain about 0.001 to 1 per cent by weight, per 100 parts of olefin polymer of crosslinking agent which is commonly employed to crosslink olefin polymers. Such crosslinking agents would include free-radical generating agents such as organic peroxygen compounds such as dicumyl peroxide; tertiarybutyl perbenzoate; 2,5-dimethyl-2,5-di-(tertiary-butyl peroxide)-hexane; and 2,5-dimethyl-2,5-di(tertiary butyl peroxy)-hexyne; and azo compounds such as 2-phenol azo-2,4-dimethylvaleronitrile, 2-phenylazoisobutyronitrile; 2-phenyl azo -2,4,4-trimethylvaleronitrile; and 2-phenylazoisobutyramide. In addition to the olefin polymer, stabilizer, crosslinking agent, if any, and fatty acid salt, the compositions of the present invention may contain other adjuvant materials which are commonly employed in olefin polymer-based rotational casting compositions. Such other adjuvants would include plasticizers, fillers, pigments, lubricants, slip agents, modifiers and similar materials.

The fillers which may be used in the olefin polymer-based rotational casting compositions of the present invention are the fillers which are commonly used with such polymers. The fillers are used in amounts which correspond to about 0.01 to 2 per cent by weight, based on 100 parts by weight of the olefin polymer. Such fillers would include materials such as carbon black, titanium dioxide, clays, diatomaceous earth, calcium silicates and others known in the art.

The plasticizers which may be employed in the olefin polymer-based rotational casting compositions of the present invention are the plasticizers which are commonly used with such polymers. The plasticizers are used in amounts which would correpond to about 0.01 to 2 per cent by weight based on 100 parts by weight of olefin polymer. The preferred plasticizer which may be used in this regard is mineral oil.

The lubricants which are commonly employed in the olefin polymer-based rotational casting compositions are the lubricants which are commonly used with such polymers. The lubricants are used in amounts which correspond to about 0.01 to 1 per cent by weight of lubricant agent per 100 parts by weight of olefin polymer. Examples of such lubricants are fatty acid amides such as stearamide, oleamide, behenamide and erucamide.

The rotational molding compositions of the present invention can be used for the production of any shaped article which may be prepared by rotational casting techniques. The molded articles produced by the present invention, although highly stabilized, are free of pinholes on the surface thereof and may be readily painted with conventional paints for such molded objects.

The molding process employed in the present invention employs standard rotational molding conditions. Such conditions usually entail a molding time of about 5 to 20 minutes at a molding temperature of about 100° to 400°C.

Reduced viscosity values are computed by the use of the equation:

$$\text{Reduced Viscosity} = t_s - t_o / c t_o$$

wherein $t_o$ is the efflux time of the solvent, $t_s$ is the efflux time of the solution of olefin polymer, and $c$ is the concentration of the olefin solution in terms of grams of polyolefin per 100 milliliters of solvent.

The following examples are merely illustrative of the present invention and are not intended as a limitation upon the scope thereof.

EXAMPLE 1

An unstabilized composition consisting of 500 grams of ethylene homopolymer which had a density of 0.918; a reduced viscosity of 0.86 at 130°C. in decalin as a solvent; and a melt index of 9 grams per 10 minutes could be rotationally cast in a 9-minute cycle at 550°F. so as to provide a molded object in the shape of a cylinder having a volume of 6 liters and walls 135 mils thick and which had a pinhole-free surface. Wall sections, 3½ X 3½ inches of the molded object produced, however, suffered a loss of physical properties with respect to low temperature impact properties, specifically at −40°C. under 30 foot pounds of impact. Under such test conditions the sections of the cylinder shattered.

When 0.05 weight per cent of DBPC and 0.05 weight per cent of DLTDP were added to 500 grams of the same homo-polymer, a pinhole-free surface could not be obtained in a 13-minute molding cycle at 550°F. when the same sized cylinder was rotationally cast, although 3½ X 3½ inches wall sections of the resulting molded cylinder did not suffer a loss of physical properties as evidenced by low temperature impact properties at −40°C. under 30 foot pounds of impact. Under such test conditions the test section of the cylinder is dented by the steel ball used in the test but it does not shatter.

When 0.02 per cent by weight of calcium stearate was then added to 500 grams of the same homopolymer, stabilized as above, however, a molded cylinder having the dimensions noted above and having a pinhole-free surface could be obtained in a 9-minute molding cycle at 550°F. There was no difference in the physical properties of the molded objects prepared with the two stabilized systems, that is, the stabilized systems with and without the calcium stearate. This improvement in pinhole-free characteristics of the molded object is obtained whether the calcium stearate is dry blended or hot compounded into the highly stabilized rotational molding composition. The use of the calcium stearate will also improve the mold release properties of the stabilized molding composition when the calcium stearate is dry blended into the composition.

Pinhole-free rotationally cast cylinders, were also made, as described above, by using, as the fatty acid salt, lithium stearate, calcium laurate, cadmium stearate, magnesium stearate, aluminum stearate, barium stearate, calcium octoate and lithium ricinoleate, respectively.

EXAMPLE 2

A pinhole-free cylinder having a volume of about 6 liters and walls about 135 mils thick was rotationally cast from a composition containing 500 grams of high density polyethylene having a density of 0.054, 0.05 weight per cent of each of DBPC and DLTDP and 0.02 weight percent of calcium stearate. The casting conditions were 11 minutes at 550°F.

When the same high density polyethylene based composition, but without the calcium stearate, was rotationally cast for 11 minutes at 550°F., the resulting cylinder had pinholes in its surface.

When a cylinder was rotationally cast from 500 grams of the high density polyethylene for 11 minutes at 550°F. the product had a pinhole-free surface.

EXAMPLE 3

A pinhole-free cylinder having a volume of about 6 liters and walls about 135 mils thick was rotationally cast from a composition containing 500 grams of an ethylene-vinyl acetate copolymer, 0.05 weight per cent of each of DBPC and DLTDP and 0.02 weight per cent of calcium stearate. The copolymer contained about 80 weight per cent of ethylene and about 20 weight per cent of vinyl acetate and had a melt index of about 24–32 grams per 10minutes. The casting conditions were 7 minutes at 550°F. The cast cylinder contained a small and unobjectional number of bubbles.

When the same copolymer based composition, but without the calcium stearate, was rotationally cast for 7 minutes at 550°F., the resulting cylinder had pinholes in its surface and contained a moderate and objectionable number of bubbles.

When a cylinder was rotationally cast from 500 grams of the copolymer for 7 minutes at 550°F., the product had a pinhole-free surface and contained a small and unobjectionable number of bubbles.

EXAMPLE 4

A series of tests were run to demonstrate the need for using specific amounts of the fatty acid salt in order to provide molded objects which are devoid of pinholes and which have superior physical properties. The polymer used in this series of tests was the homopolymer of Example 1.

The compositions tested contained DBPC, DLTDP and various amounts of calcium stearate as shown in Table I below. The compositions were used to form rotationally cast cylinders which had walls which were about 135 mils thick and had a volume of about 6 liters. The casting conditions were 9 minutes at 550°F. using a 500 gram charge. All the cylinders were free of pinholes and bubbles, but the compositions containing more than 0.04 per cent by weight of calcium stearate exhibited a complete loss of low temperature impact properties at −40°C. under 30 foot pounds of impact. Table I also lists the percentage of test specimens made from each of the six compositions that exhibited a loss of low temperature properties at −40°C. under 30 foot pounds of impact. The test specimens used were 3½ × 3½ inches wall sections of the rotationally cast cylinders. Twenty four test specimens were tested for each of the six compositions that were evaluated. The "per cent of test specimens passing" the test represents the percentage of the test specimens that did not shatter under the impact test conditions.

TABLE I

| Compositions | 1 | 2 | 3 | 4 | 5 | 6 |
|---|---|---|---|---|---|---|
| Components (in parts by weight) | | | | | | |
| polymer | 99.88 | 99.875 | 99.87 | 99.865 | 99.86 | 99.85 |
| DBPC | 0.05 | 0.05 | 0.05 | 0.05 | 0.05 | 0.05 |
| DLTDP | 0.05 | 0.05 | 0.05 | 0.05 | 0.05 | 0.05 |
| Calcium Stearate | 0.02 | 0.025 | 0.03 | 0.035 | 0.04 | 0.05 |
| Low temperature properties % of test specimens passing 30 foot pounds impact test at −40°C. | 100 | 42 | 42 | 50 | 42 | 0 |

EXAMPLE 5

A series of tests were run to demonstrate the utility of the present invention with a variety of antioxidant materials. The polymer used in this series of tests was the same as that used in Example 1.

The compositions tested are listed in Table II below. The compositions were used to form rotationally cast cylinders and were evaluated for low temperature properties as in Example 4.

The properties of the resulting cylinders are also disclosed in Table II.

TABLE II

| Compositions | 1 | 2 | 3 | 4 | 5 | 6 | 7 | 8 |
|---|---|---|---|---|---|---|---|---|
| Components (in parts by weight) | | | | | | | | |
| Polymer | 99.88 | 99.88 | 99.88 | 99.88 | 99.88 | 99.83 | 99.88 | 99.88 |
| DBPC | — | — | — | — | — | 0.05 | 0.05 | — |
| DLTDP | 0.05 | 0.05 | 0.05 | 0.05 | 0.05 | 0.05 | — | 0.05 |
| Irganox 1010 | 0.05 | — | — | — | — | — | — | — |
| Irganox 1076 | — | 0.05 | — | — | — | — | — | — |
| Polyguard | — | — | 0.05 | — | — | — | — | — |
| CAO-6 | — | — | — | 0.05 | — | — | — | — |
| Agerite white | — | — | — | — | 0.05 | — | — | — |
| Tinuvin 328 | — | — | — | — | — | 0.05 | — | — |
| Wytox 438 | — | — | — | — | — | — | 0.05 | — |
| Topanol CA | — | — | — | — | — | — | — | 0.05 |
| Calcium stearate | 0.02 | 0.02 | 0.02 | 0.02 | 0.02 | 0.02 | 0.02 | 0.02 |
| Properties | | | | | | | | |
| pinhole free | yes | yes | yes | yes | yes | yes | yes | yes |
| bubble free | yes | yes | yes | yes | no | yes | yes | yes |
| % of test specimens passing 30 ft. lbs. impact test at −40°C. | 58 | 25 | 83 | 92 | 83 | 83 | 83 | 83 |

Irganox 1010 is tetrakis[methylene-3-(3′,5′-di-tert-butyl-4′-hydroxy phenyl)propionate]methane.

Irganox 1076 is octadecyl-3-(3,5-di-tert-butyl-4-hydroxy phenyl)propionate.

Polyguard is tri(mixed mono- and dinonyl phenyl)-phosphite.

CAO-6 is 2,2′-thiobis-(4′-methyl-6-tert-butyl phenol).

Agerite white is di-beta-naphthyl-p-phenylene diamine.

Tinuvin 328 is a substituted benzotrizole.

Wytox 438 is tri(nonyl phenyl)phosphite-formaldehyde resin.

Topanol CA is 1,1,3-tris(2-methyl-4-hydroxy-5-tertiary butyl phenyl)butane.

The compositions used in all of the examples were prepared in the form of powders or powder blends which would pass through a 25 mesh sieve.

What is claimed is:

1. An olefin polymer-based composition adaptable for use in rotational molding applications and consisting essentially of olefin polymer selected from the group consisting of olefin homopolymers, interpolymers of one or more olefins with each other, and interpolymers of one or more olefins and up to about 50 weight per cent of one or more other monomers which are copolymerizable with such olefins,
   stabilizing effective quantities of at least one antioxidant for said olefin polymer, and
   about 0.001 to 0.05 per cent by weight, based on the weight of said olefin polymer, of fatty acid salt selected from the group consisting of the calcium, lithium, magnesium, barium, cadmium and aluminum salts of the $C_8$ to $C_{18}$ fatty acids,
   said composition being in powder form and adapted to pass through a $\geq 15$ mesh screen.

2. A composition as in claim 1 in which said olefin polymer is an ethylene polymer.

3. A composition as in claim 2 in which said ethylene polymer is a homopolymer.

4. A composition as in claim 3 in which said salt is selected from the group consisting of the calcium salts of the $C_8$ to $C_{18}$ fatty acids.

5. A composition as in claim 4 in which said salt is calcium stearate.

6. A composition as in claim 3 in which said salt is selected from the group consisting of the lithium salts of the $C_8$ to $C_{18}$ fatty acids.

7. A composition as in claim 6 in which said salt is lithium stearate.

8. A composition as in claim 1 in which said antioxidant comprises dilauryl thiodipropionate.

9. A composition as in claim 1 in which said antioxidant comprises 2,6-di-tert-butyl-p-cresol.

10. An olefin polymer-based rotational molding composition consisting essentially of ethylene polymer,
    stabilizingly effective quantities of at least one antioxidant for said ethylene polymer, and
    about 0.001 to 0.05 per cent by weight, based on the weight of said ethylene polymer, of fatty acid salt selected from the group consisting of the calcium, lithium, magnesium, barium, cadmium and aluminum salts of the $C_8$ to $C_{18}$ fatty acids,
    said composition being in powder form and adapted to pass through a $\geq 25$ mesh screen.

11. A composition as in claim 10 in which said ethylene polymer is a homopolymer.

12. A composition as in claim 11 in which said antioxidant comprises at least one phenol and at least one non-phenolic sulfur containing compound.

13. A composition as in claim 12 in which said antioxidant comprises 2,6-di-tert-butyl-p-cresol and dilauryl thiodipropionate.

14. A composition as in claim 13 in which said fatty acid salt is a calcium salt.

15. A composition as in claim 14 in which said fatty acid salt is calcium stearate.

16. A composition as in claim 13 in which said fatty acid salt is a lithium salt.

17. A composition as in claim 16 in which said fatty acid salt is lithium stearate.

18. A rotationally molded product formed from the composition of claim 1.

19. In a process for rotationally molding an olefin polymer-based composition, the improvement essentially consisting of, using as said composition, the composition of claim 1.

20. An olefin polymer based composition adaptable for use in rotational molding applications and consisting essentially of olefin polymer selected from the group consisting of olefin homopolymers, interpolymer of one or more olefins with each other, and interpolymers of one or more olefins and up to about 50 weight per cent of one or more other monomers which are copolymerizable with such olefins,
    atabilizingly effective quantities of at least one antioxidant other than carbon black for said olefin polymer, and
    about 0.001 to 0.05 percent by weight, based on the weight of said olefin polymer, of fatty acid salt selected from the group consisting of the calcium, lithium, magnesium, barium, cadmium and aluminum salts of the $C_8$ to $C_{18}$ fatty acids,
    said composition being in powder form and adapted to pass through a $\geq 15$ mesh screen.

21. An olefin polymer-based rotational molding composition consisting essentially of ethylene polymer,
    stabilizingly effective quantities of at least one antioxidant other than carbon black for said ethylene polymer, and
    about 0.001 to 0.05 per cent by weight, based on the weight of said ethylene polymer, of fatty acid salt selected from the group consisting of the calcium, lithium, magnesium, barium, cadmium and aluminum salts of the $C_8$ to $C_{18}$ fatty acids,
    said composition being in powder form and adapted to pass through a $\geq 15$ mesh screen.

* * * * *

UNITED STATES PATENT OFFICE
CERTIFICATE OF CORRECTION

Patent No. 3,974,114           Dated   August 10, 1976

Inventor(s)  Michael W. Sowa

It is certified that error appears in the above-identified patent and that said Letters Patent are hereby corrected as shown below:

Column 2, line 15, change "0.5" to --0.05--.

Column 4, line 25, "methylphenyl" should read --methylphenol--.

Column 5, line 3, "phenol" should read --phenyl--.

Column 10, line 25, "interpolymer" should read --interpolymers--.

Column 10, line 30, "atabilizingly" should read --stabilizingly--.

Signed and Sealed this

Twelfth Day of October 1976

[SEAL]

Attest:

RUTH C. MASON
Attesting Officer

C. MARSHALL DANN
Commissioner of Patents and Trademarks